United States Patent
Wang et al.

(10) Patent No.: US 11,462,194 B1
(45) Date of Patent: Oct. 4, 2022

(54) POSITION SENSORS FOR SYSTEM WITH OVERLAPPED DISPLAYS

(71) Applicant: Apple Inc., Cupertino, CA (US)

(72) Inventors: Paul X. Wang, Cupertino, CA (US); Tianjia Sun, Santa Clara, CA (US); Chang Zhang, San Jose, CA (US); Dominic P. McCarthy, Los Altos Hills, CA (US); Eric Shyr, Cupertino, CA (US); John B. Morrell, Los Gatos, CA (US); John P. Ternus, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 16/049,643

(22) Filed: Jul. 30, 2018

(51) Int. Cl.
| | |
|---|---|
| *G09G 5/12* | (2006.01) |
| *G06F 3/14* | (2006.01) |
| *G09G 5/14* | (2006.01) |
| *G06F 3/0346* | (2013.01) |
| *G06F 1/16* | (2006.01) |
| *G01D 5/241* | (2006.01) |
| *H04M 1/72412* | (2021.01) |

(52) U.S. Cl.
CPC .............. *G09G 5/12* (2013.01); *G01D 5/2412* (2013.01); *G06F 1/165* (2013.01); *G06F 1/169* (2013.01); *G06F 1/1662* (2013.01); *G06F 1/1681* (2013.01); *G06F 3/0346* (2013.01); *G06F 3/1423* (2013.01); *G09G 5/14* (2013.01); *H04M 1/72412* (2021.01); *G09G 2354/00* (2013.01); *G09G 2370/16* (2013.01); *H04M 2250/12* (2013.01)

(58) Field of Classification Search
CPC ........ G09G 5/12; G09G 5/14; G09G 2354/00; G09G 2370/16; G01D 5/2412; G06F 1/165; G06F 1/1662; G06F 1/1681; G06F 1/169; G06F 3/0346; G06F 3/1423; H04M 1/7253; H04M 2250/12
See application file for complete search history.

(56) References Cited

U.S. PATENT DOCUMENTS

| | | | |
|---|---|---|---|
| 6,868,451 | B1 | 3/2005 | Peacock |
| 8,970,655 | B2 * | 3/2015 | Paripally ................. H04N 7/144 250/208.1 |
| 9,013,366 | B2 | 4/2015 | Zheng et al. |
| 9,116,663 | B2 * | 8/2015 | Prociw .............. H04M 1/72409 |

(Continued)

FOREIGN PATENT DOCUMENTS

WO    2017184800    10/2017

*Primary Examiner* — Patrick N Edouard
*Assistant Examiner* — Eboni N Giles
(74) *Attorney, Agent, or Firm* — Treyz Law Group, P.C.; G. Victor Treyz; Kendall P. Woodruff

(57) ABSTRACT

A system may include electronic devices that communicate wirelessly. When positioned so that a pair of devices overlap or are adjacent to one another, the devices may operate in a linked mode. During linked operations, devices may communicate wirelessly while input gathering and content displaying operations are shared among the devices. One or both of a pair of devices may have sensors. A capacitive sensor or other sensor may be used to measure the relative position between two devices when the two devices overlap each other. Content displaying operations and other linked mode operations may be performed based on the measured relative position between the two devices and other information.

20 Claims, 10 Drawing Sheets

(56) References Cited

U.S. PATENT DOCUMENTS

| | | |
|---|---|---|
| 2010/0257251 A1 | 10/2010 | Mooring et al. |
| 2011/0081923 A1 | 4/2011 | Forutanpour et al. |
| 2011/0237274 A1 | 9/2011 | Wong et al. |
| 2011/0239114 A1 | 9/2011 | Falkenburg et al. |
| 2011/0294433 A1* | 12/2011 | Matsubara ........ H04M 1/72412 455/41.3 |
| 2012/0054401 A1* | 3/2012 | Cheng ................. G06F 1/1632 710/304 |
| 2012/0206319 A1 | 8/2012 | Lucero et al. |
| 2012/0206391 A1* | 8/2012 | Kim .................. H04M 1/72412 345/173 |
| 2012/0208466 A1* | 8/2012 | Park .................. H04N 21/4108 455/41.3 |
| 2012/0208514 A1* | 8/2012 | Park .................... H04W 4/023 455/418 |
| 2013/0009863 A1* | 1/2013 | Noda .................... G09G 3/003 345/87 |
| 2013/0040567 A1* | 2/2013 | Matsubara ............ G06F 3/0482 455/41.1 |
| 2013/0091205 A1 | 4/2013 | Kotler et al. |
| 2013/0109310 A1* | 5/2013 | Mine .................... G06F 1/1632 455/41.1 |
| 2014/0123038 A1* | 5/2014 | Ahn ..................... G06F 1/1698 715/761 |
| 2015/0199089 A1* | 7/2015 | Lee ......................... G09G 5/14 715/716 |
| 2017/0086308 A1* | 3/2017 | Large ...................... H05K 5/0017 |
| 2017/0160848 A1* | 6/2017 | Cao ........................ G06F 3/0412 |
| 2017/0187377 A1* | 6/2017 | Gong ...................... G06F 1/1616 |
| 2017/0285843 A1* | 10/2017 | Roberts-Hoffman ........................ G06F 3/0485 |

\* cited by examiner

POSITION SENSORS FOR SYSTEM WITH OVERLAPPED DISPLAYS

FIELD

This relates generally to electronic devices, and, more particularly, to systems with multiple electronic devices.

BACKGROUND

Electronic devices such as computers and cellular telephones are often used as stand-alone devices. Although it is possible to wirelessly share data between these devices, sharing can be complex and cumbersome.

SUMMARY

A system may include electronic devices that communicate wirelessly. The devices may include displays. In some arrangements, devices may be positioned so that the displays of the devices overlap.

When positioned so that a pair of devices overlap or are adjacent to one another, the devices may operate in a linked mode. During linked operations, devices may communicate wirelessly while input gathering and content displaying operations are shared among the devices. For example, a user may seamlessly move a pointer that is present on the display of a first device to the display of a second device. Using the pointer or other shared user input arrangements, content may be moved between devices (e.g., a file on one display may be dragged and dropped onto another display, thereby sharing the file between devices).

One or more devices in the system may have sensors. A capacitive sensor or other sensor may be used to measure the relative position between two devices when the two devices overlap each other. Content displaying operations and other linked mode operations may be performed based on the measured relative position between the two devices. For example, content that is to be presented to a user may be apportioned between the displays of the overlapping devices based on the relative position between the devices.

DETAILED DESCRIPTION

Electronic devices with displays may be linked. This allows a user to move content between devices and perform other operations involving the use of the linked devices. In some configurations, electronic devices are placed adjacent to one another or are positioned so that one device overlaps the other.

Figure 1:
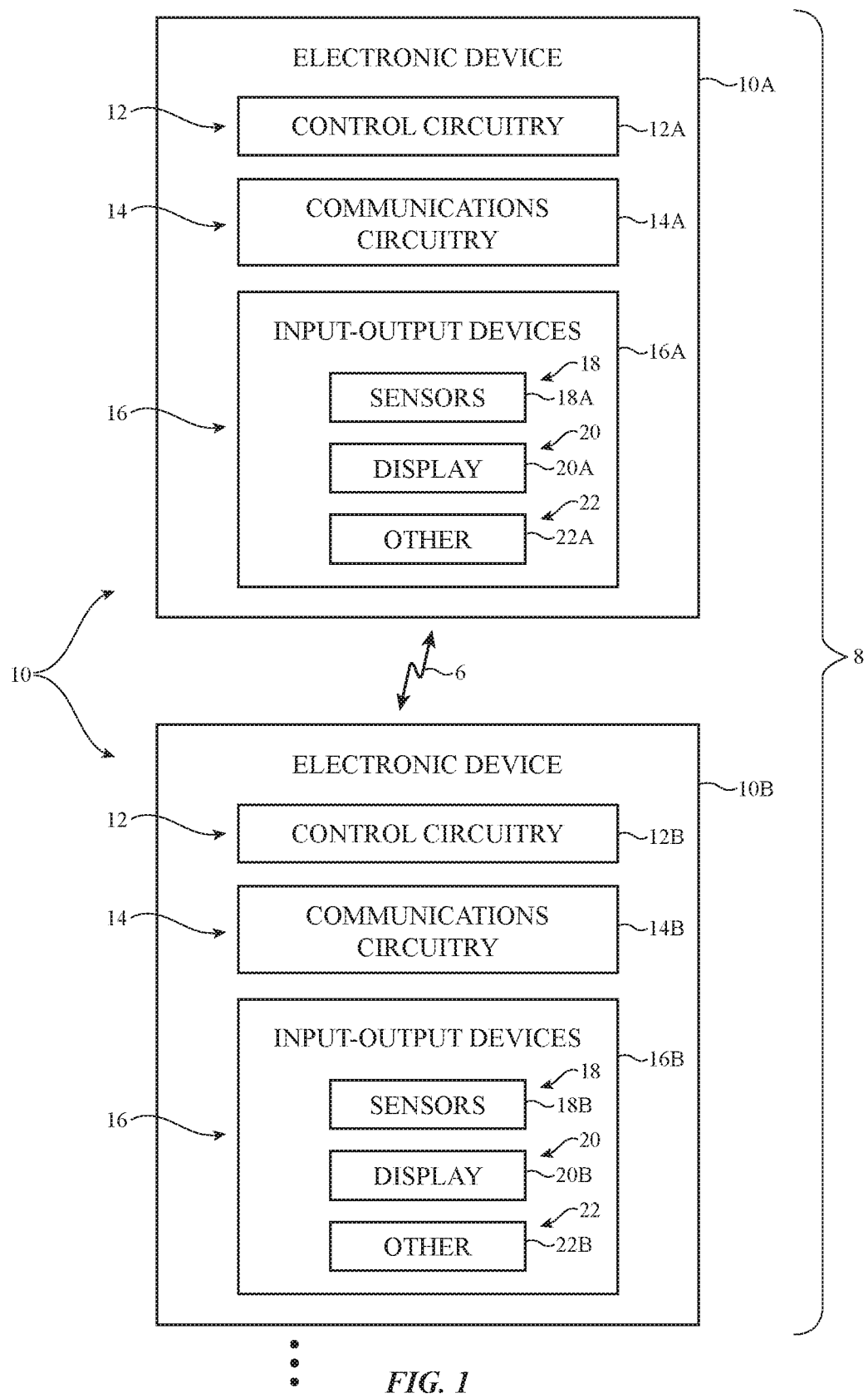
FIG. 1 is a schematic diagram of an illustrative system with electronic devices in accordance with an embodiment.

An illustrative system with electronic devices is shown in FIG. 1. As shown in FIG. 1, system 8 may include electronic devices 10. There may be any suitable number of electronic devices 10 in system 8 (e.g., at least two, at least three, at least four, fewer than ten, fewer than five, etc.).

Each device 10 may be a laptop computer, a computer monitor containing an embedded computer, a tablet computer, a desktop computer, a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a navigation device, an embedded system such as a system in which equipment is mounted in a kiosk, in an automobile, airplane, or other vehicle, a removable external case for electronic equipment, an accessory such as a remote control, computer mouse, track pad, wireless or wired keyboard, or other accessory, and/or equipment that implements the functionality of two or more of these devices.

In the example of FIG. 1, devices 10 include a first device 10A and a second device 10B. Devices 10 may include control circuitry 12 (e.g., control circuitry 12A in device 10A and control circuitry 12B in device 10B). Control circuitry 12 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and/or to support communications between equipment in system 8 and external electronic equipment, control circuitry 12 may communicate using communications circuitry 14 (e.g., communications circuitry 14A in device 10A and communications circuitry 14B in device 10B). Communications circuitry 14 may include antennas, radio-frequency transceiver circuitry, and other wireless communications circuitry and/or wired communications circuitry.

Circuitry 14, which may sometimes be referred to as control circuitry and/or control and communications circuitry, may, for example, support bidirectional wireless communications between devices 10 over wireless link 6 (e.g., a wireless local area network link, a near-field communications link, or other suitable wired or wireless communications link (e.g., a Bluetooth® link, a WiFi® link, a simultaneous dual band WiFi link, a WiFi Direct link, a 60 GHz link or other millimeter wave link, etc.). Wired communications also be supported.

During operation of system 8, devices 10 may communicate wirelessly or via wired paths to control the operation of system 8. For example, user input and other input gathered using sensors and other circuitry in one or more devices 10, output such as visual content to be displayed on displays in devices 10, and other input and/or output information may be wirelessly transmitted or transmitted via wired connections to one or more devices 10 and thereby shared among devices 10. For example, input can be gathered from a user on device 10A and/or device 10B and used in controlling device 10A and/or device 10B, output can be generated on device 10A and/or device 10B (e.g., using control circuitry 12) and subsequently presented on a display, speaker, or other output component(s) in device 10A and/or 10B, and/or other sharing operations may be performed. This allows a user to drag and drop content between devices 10, to perform screen-sharing operations, and/or to perform other cooperative operations. When functionality is shared between devices 10A and 10B in this way, devices 10A and 10B may be referred to as operating in a linked mode.

As shown in FIG. 1, devices 10 may include input-output devices 16 (e.g., input-output devices 16A on device 10A and input-output devices 16B on device 10B). Input-output devices 16 may be used in gathering user input, in gathering information on the environment surrounding the user, and/or in providing a user with output. Devices 16 may include sensors 18A and 18B). Sensors 18 may include force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, and/or other sensors.

Input-output devices 16 may also include displays 20 (e.g., one or more displays 20A and/or one or more displays 20B). Displays 20 may be organic light-emitting diode displays, displays based on arrays of crystalline semiconductor dies forming light-emitting diodes, liquid crystal displays, electrophoretic displays, and/or other displays. Displays 20 may be touch-insensitive displays (e.g., displays without touch sensor arrays that are insensitive to touch) or may, if desired, be overlapped by a two-dimensional capacitive touch sensor or other touch sensor (e.g., displays 20 may be touch screen displays). A touch display may have a two-dimensional capacitive touch sensor formed from a two-dimensional array of touch sensor electrodes (e.g., transparent conductive electrodes) overlapping an array of display pixels. A touch-insensitive display (sometimes referred to as a non-touch-sensor display) does not contain a two-dimensional array of touch sensor electrodes and does not gather user touch input.

If desired, input-output devices 16 may include other devices 22 (e.g., devices 22A and/or 22B). Devices 22 may include components such as status indicator lights (e.g., light-emitting diodes in devices 10 that serves as power indicators, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 22 may also include power transmitting and/or receiving circuits configured to transmit and/or receive wired and/or wireless power signals. Devices 22 may include buttons, rotating buttons, push buttons, joysticks, keys such as alphanumeric keys in a keyboard or keypad, and/or other devices for gathering user input.

If desired, devices 22 may include haptic output devices. Haptic output devices can produce motion that is sensed by the user (e.g., through the user's fingertips, hands, arms, legs, face, or other body parts). Haptic output devices may include actuators such as electromagnetic actuators, motors, piezoelectric actuators, shape memory alloy actuators, electroactive polymer actuators, vibrators, linear actuators, rotational actuators, actuators that bend bendable members, actuator devices that create and/or control repulsive and/or attractive forces between devices 10 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10).

Figure 2:
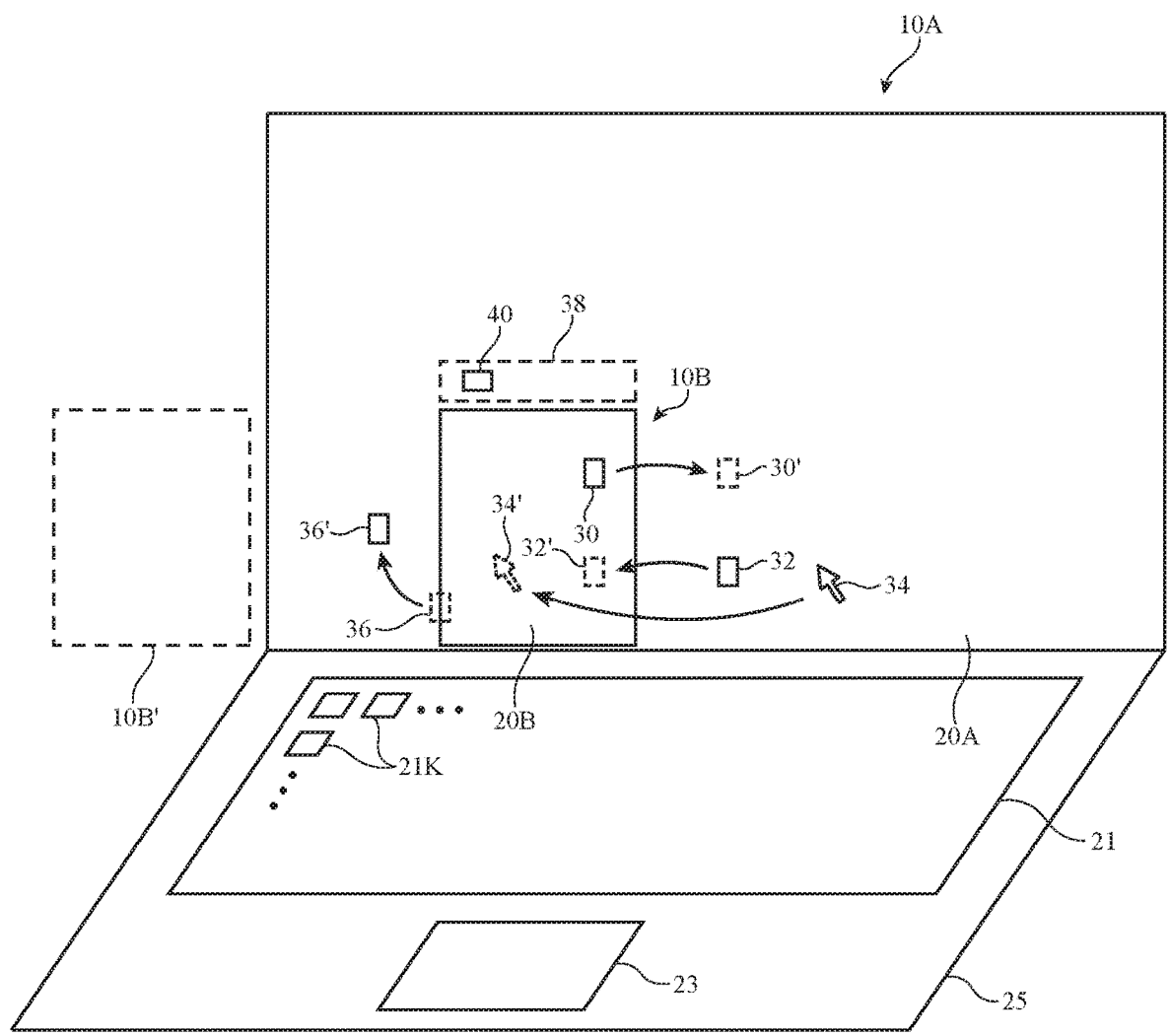
FIG. 2 is a front view of a pair electronic devices in accordance with an embodiment.

FIG. 2 is a front view of system 8 showing how display 20A of device 10A may be overlapped by display 20B of device 10B (e.g., when a cellular telephone or other small portable device is placed in front of a computer or other equipment with a larger display). In some arrangements, device 10B may be placed adjacent to device 10A as shown by illustrative device 10B' (e.g., so that the displays share an adjacent edge). Configurations in which one display at least partially overlaps another display in system 8 are sometimes described herein as an example. Device 10A may, if desired, be a laptop computer in which display 20A is located in an upper housing (sometimes referred to as a display housing or upper housing portion) and in which input devices such as keyboard 21 with keys 21K and trackpad 23 are located in a lower housing 25 (sometimes referred to as a base housing or lower housing portion). A hinge may be used to couple the upper and lower housing portions of device 10A for rotational motion (e.g., so that keyboard 21 may rotate relative to display 20A when the laptop is being opened or closed).

When device displays are overlapped as shown in FIG. 2, device 10A (e.g., the overlapped device) may display content in a region such as region 38 adjacent to one or more of the edges of device 10B. This content may include a label (e.g., "Bob's phone" or other label corresponding to the identity of device 10B) or instructions (e.g., "drag and drop files here to transfer"). Region 38 may serve as an indicator that devices 10A and 10B are linked and/or may operate as a transfer region to facilitate drag-and-drop sharing of content between devices 10. When device 10B is moved, region 38 may be moved accordingly.

The placement of device 10B overlapping device 10A may also cause icons on display 20A to be automatically repositioned to avoid obscuring these icons (see, e.g., illustrative icon 36 on display 20A that is being moved to position 36' automatically in response to detection that device 10B is overlapping icon 36).

During linked operations, a user may move on-screen content between displays. For example, pointer 34 (and/or an icon or other content selected by pointer 34) may be moved seamlessly between devices 10 (e.g., to illustrative position 34' on display 20B and vice versa). This allows icon 32 and associated content on device 10A to be shared with device 10B (e.g., by dragging and dropping icon 32 to position 32') and allows content on device 10B to be shared with device 10A (e.g., by dragging and dropping icon 30 to position 30'). During these operations, the content on display 10B may seamlessly extend onto surrounding portions of display 10A so that display 10A and display 10B operate as a single visual output space for the user of system 8 (e.g., a computer desktop). Icons that are moved or otherwise manipulated (e.g., by clicking or other gestures) may correspond to photographs, word processing documents, media files, software applications, or other files.

Dragging and dropping operations may be performed using cursor 34 and/or touch input. For example, a user may use a track pad or other input component in device 10A to move cursor 34 and thereby move an icon or other content between devices 10 and/or the user may perform a flick gesture or drag-and-drop gesture using a touch sensor overlapping display 20B (and/or display 20A) to move content. In some configurations, a user may flick, drag and drop, or otherwise share content between devices 10 using region 38 (e.g., by placing an icon such as illustrative icon 40 of FIG. 2 into region 38 or a predetermined of display 20B). A user may also use pointer 34 on display 20A and/or display 20B to double click or otherwise select items (e.g., to click on an icon to launch and application, etc.). When an item is selected (e.g., when an email program is launched on device 10B, a user may operate that program using the shared input circuitry of device 10A. For example, a user may type text into an email application on device 10B using a keyboard in device 10A.

Cooperative operations such as these may be performed using control circuitry 12A and/or 12B. In performing these operations, control circuitry 12 may gather sensor information indicative of the position of device 10B (and display 20A) relative to device 10A (and display 20A). For example, sensor measurements using sensors 18 (e.g., relative position information) may be used to determine the display pixel coordinates that correspond to the portion of display 20A that is overlapped by display 20B so that screen content can be shared accordingly.

Figure 3:
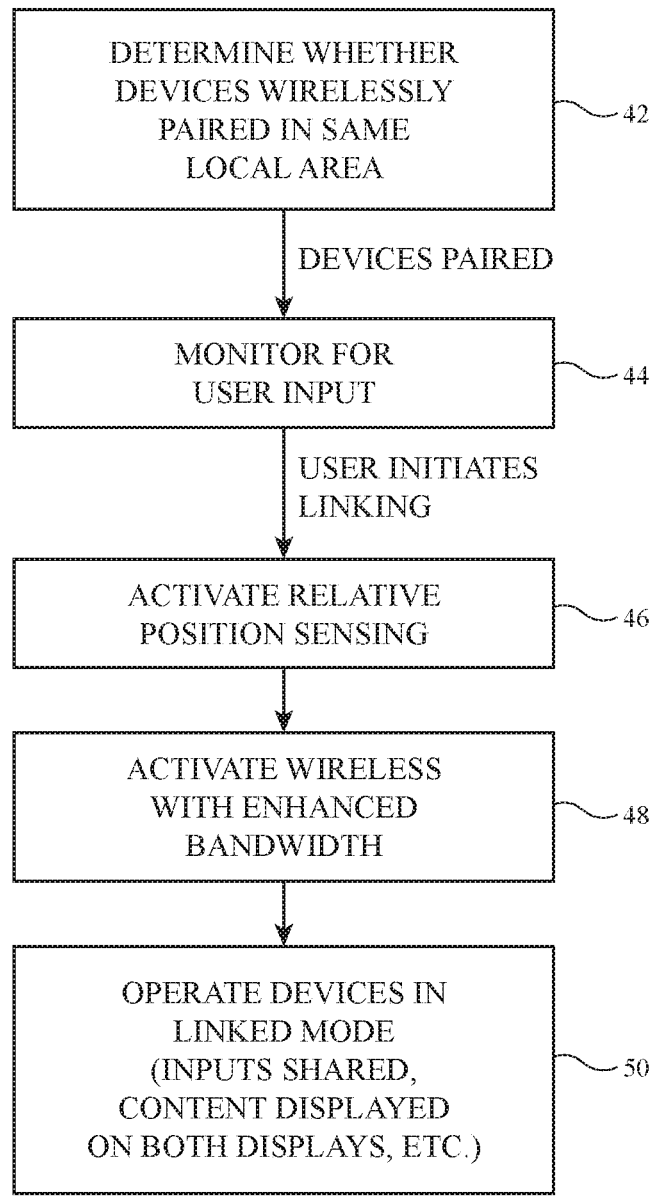
FIGS. 3 and 4 are flow charts of illustrative operations involved in operating electronic devices in a linked mode in accordance with an embodiment.

Linking of devices 10 may be performed based on user input (e.g., user input gathered by devices 16) and/or may be linked based on other criteria (e.g., devices 10 may be linked automatically and/or semiautomatically based on information from input-output devices 16 and/or communications circuitry 14 in addition to or instead of user input information). Flow charts of illustrative linking operations are shown in FIGS. 2 and 3. These are illustrative linking operations. Other techniques for linking devices 10 may be used, if desired.

In the example of FIG. 3, control circuitry 12 determines whether devices 10 are coupled wirelessly during the operations of block 42. For example, control circuitry 12 may use Bluetooth® or WiFi® circuitry or other communications circuitry 14 (e.g., wireless communications circuitry such as wireless local area network communications circuitry) to determine whether devices 10 are paired and/or are located on the same local area network.

In response to determining that devices 10 are wirelessly communicating in this way, control circuitry 12 can conclude that devices 10 are in relatively close proximity to each other (e.g., within tens or hundreds of meters of each other). Operations may then proceed to block 44.

During the operations of block 44, control circuitry 12 may monitor for user input indicating that the user desires to initiate linked operation. The user input may be a particular gesture performed by moving device 10B towards display 20A, may be a shaking motion used to shake device 10B, may be a touch screen input, voice input, and/or other input detected using one or more sensors 18 or other devices 16. In response to detecting appropriate triggering input, operations may proceed to block 46.

During the operations of block 46, position sensor circuitry (e.g., sensors 18) may be used by circuitry 12 in determining the relative position between devices 10A and 10B (e.g., to determine display overlap coordinates). In particular, a capacitive sensor or other sensor on device 10A or other sensors 18 may be used to determine the portion of display 20A that is being overlapped by display 20B, as shown in FIG. 2. It may be desirable to invoke position sensing operations for block 46 only upon detection of the appropriate input at block 44 to help conserve power.

During the operations of block 48, an optional additional wireless communications path can be formed between devices 10. For example, if the wireless link between devices 10 that was detected during the operations of block 42 was a Bluetooth link, then a WiFi direct link, simultaneous dual band WiFi link or other higher bandwidth wireless communications link may be established between devices 10 during the operations of block 48.

During the operations of block 50, devices 10 may be operated in linked mode so that input gathering and content displaying operations are shared as described in connection with FIG. 2 (e.g., input and may be shared across devices 10, content may be seamlessly displayed on display 20B overlapping display 20A, etc.).

Figure 4:
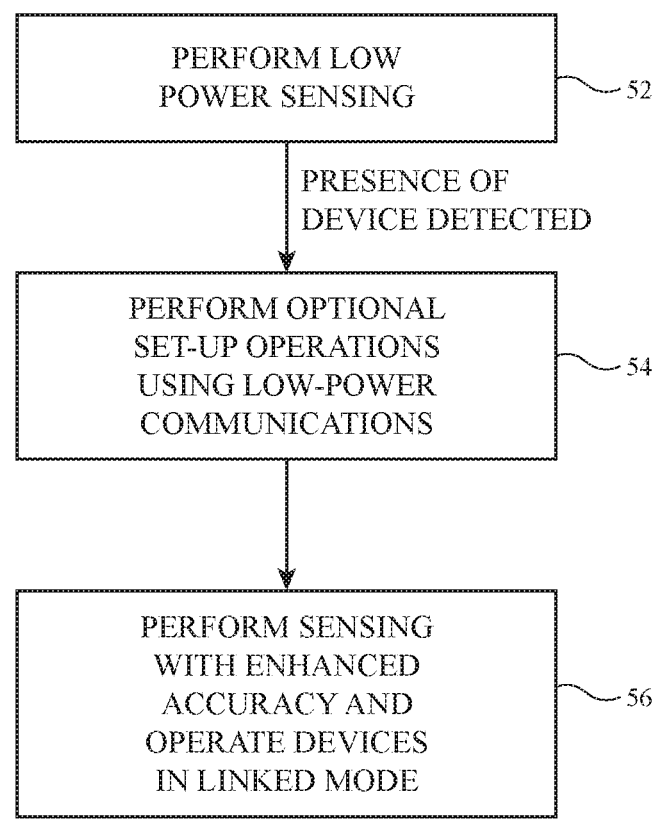

Another illustrative technique for linking devices 10 is shown in FIG. 4. As shown in FIG. 4, devices 10 may, if desired, perform low-power sensing for the presence of overlap (or adjacency) between devices 10 during the operations of block 52. Low-power sensing may be performed using one or more of sensors 18. In some configurations, one of more of sensors 18 may be operated in a lower power mode than during normal operation. For example, a capacitive position sensor that is normally used in measuring the relative positions between devices 10A and 10B may, during the operations of block 52 be operated at a lower power (e.g., a lower frequency and/or lower gain) than normal. During the operations of block 52, the sensor (e.g., a capacitive sensor strip in device 10A or other sensor 18) may used in detecting whether an external device such as device 10B is present on device 10A.

If desired, device 10A (e.g., the housing of device 10A or other portions of device 10A) may contain patterned metal structures (e.g., strips of metal of varying widths and spacings, etc.), patterned magnetic structures (e.g., permanent magnets, electromagnets, and/or ferromagnetic structures such as iron bars with predetermined spacings, shapes, and/or placements), patterned optical structures (e.g., white and black strips of different sizes and spacings), and/or other structures that are patterned to encode information. The encoded information can include identity information associated with a user, type of electronic device, electronic device model number, and/or other information that helps system 8 establish linked operation between devices 10. For example, device 10B may contain metal strips that a capacitive sensor in device 10A can read to determine a serial number or model number or name for device 10B. If, as a simplified example, there are two possible models of device 10B, there may be three metal strips for sensing when it is desired to signify that device 10B is a first of the two models and there may be four metal strips for sensing when it is desired to signify that device 10B is a second of the two models.

In another illustrative arrangement, control circuitry 12B can actively drive signals onto one or more conductive structures (e.g., metal strips, housing structures, etc.) in device 10B. When device 10B is present on device 10A, a capacitive sensor or other sensor in device 10A can sense the drive signal(s) (e.g., via capacitive coupling between the conductive structure in device 10B and one or more overlapped capacitive sensor electrodes in device 10A). A drive signal may, as an example, include information such as device model information, a serial number, or other encoded information about device 10B. Capacitive sensing with a sensor in device 10A and/or other sensor circuitry can be used to obtain the encoded information (e.g., the model of device 10B, etc.).

In response to detecting the presence of device 10B and/or obtaining information about the identity of device 10B, operations may proceed to block 54. During the operation of block 54, communications via capacitive coupling between devices 10, near-field communications using coils, optical and/or acoustic communications (e.g., ultrasonic communications using microphones and/or speakers in each of devices 10), and/or other wired or wireless low-power communications may optionally be used to exchange information for setting up a wireless link between devices 10. As an example, these communications may be used to exchange Bluetooth pairing information or information for setting up a WiFi link between devices 10.

During the operations of block 56, the wireless communication link established during the operations of block 54 may be used to support linked mode operations (e.g., operations in which input gathering and content displaying operations are shared between devices 10 while devices 10 overlap or are adjacent to each other as described in connection with FIG. 2). Position sensor circuitry (e.g., a capacitive touch sensor or other sensor) may be used in gathering information on the relative position between devices 10A and 10B and this information may be used in operating displays 20A and 20B seamlessly while control circuitry 12 shares input between devices 10 and otherwise allows a user to use devices 10 in the linked mode.

Figure 5:
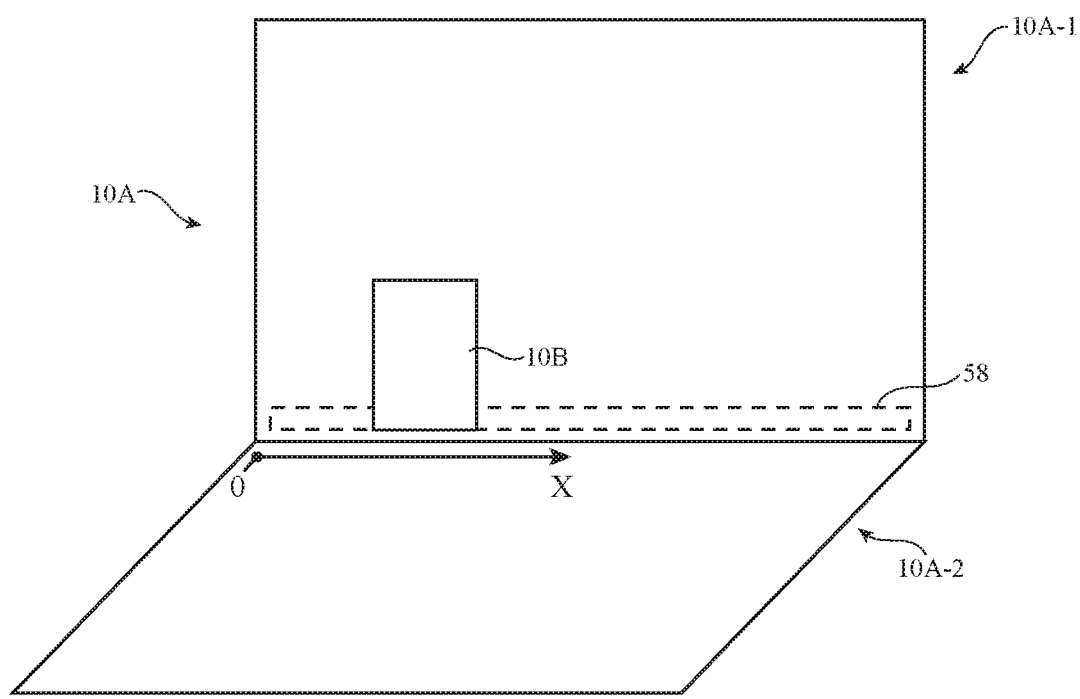
FIG. 5 is a perspective view of an illustrative pair of electronic devices in a system with position sensing circuitry for determining relative position between the devices in accordance with an embodiment.

FIG. 5 is a perspective view of devices 10A and 10B in an illustrative configuration in which device 10A has an upper portion 10A-1 (e.g., the upper portion of a laptop with a display or a tablet computer with a display) and has a lower portion 10A-2 (e.g., the keyboard portion of a laptop or a removable tablet computer cover with an optional keyboard). Device 10B may be placed in a position along the lower edge of the display in portion 10A-1, so that the display of device 10B (e.g., a display covering the front face of device 10B) overlaps part of the display of portion 10A-1 (which may, for example, cover the front face of portion 10A-1). Illustrative sensor 58 (e.g., a strip-shaped capacitive sensor or other sensor 18) may measure the positions (X axis coordinates) of the left and right edges of device 10B. The Y axis coordinates of the upper edge of device 10B can be determined by obtaining information on the model of device 10B and/or by assuming that device 10B has a standard aspect ratio.

Sensor 58 may be located along the lower edge of portion 10A-1 (as an example). The X axis of FIG. 5 may, for example, run along a hinge that joins portion 10A-1 to portion 10A-2 (e.g., in a laptop computer or a system in which a magnetic hinge joins a keyboard cover to a tablet computer). Configurations in which portion 10A-2 is omitted may also be used (e.g., when device 10B is a watch, phone, or other portable device and device 10A is a tablet or desktop computer, etc.). Based on knowledge of the width of device 10B from the sensor and/or information on the size of display 20B gathered during wireless communications between devices 10, control circuitry 12 can support linked mode operations between devices 10A and 10B as described in connection with FIG. 2.

Figure 6:
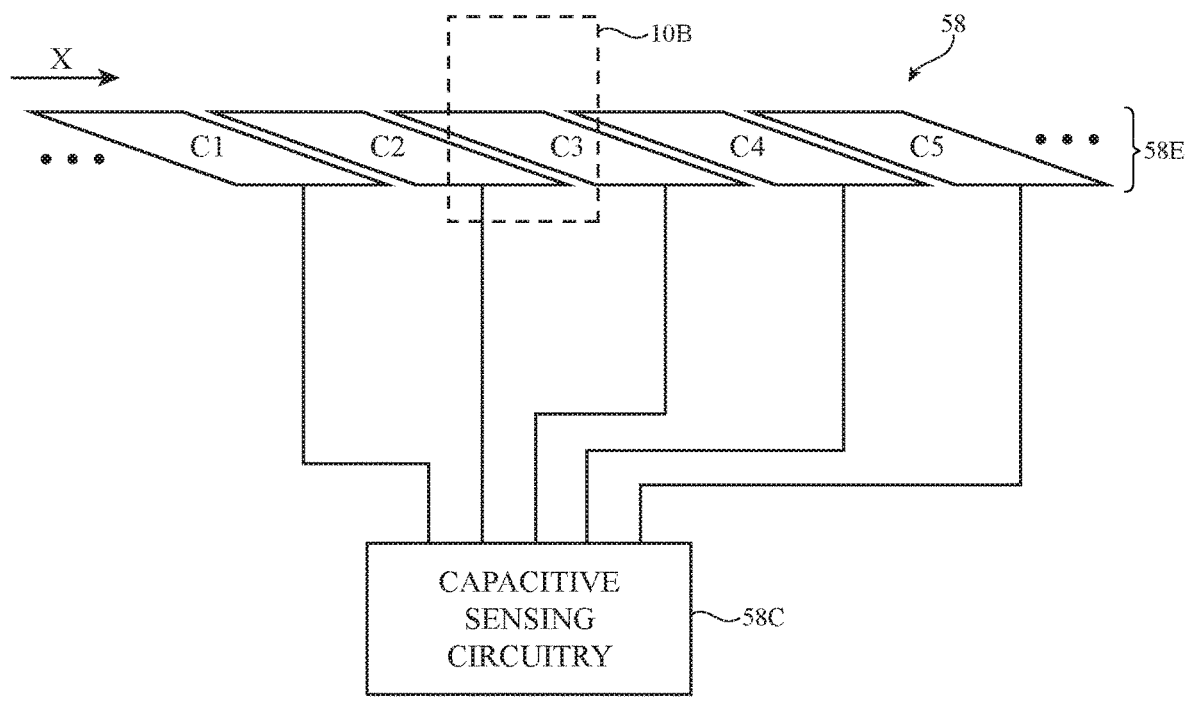
FIG. 6 is a diagram of an illustrative capacitive sensor for measuring device position in accordance with an embodiment.

An illustrative configuration for sensor 58 is shown in FIG. 6. As shown in FIG. 6, capacitive sensor 58 may have capacitive sensor electrodes 58E. Electrodes 58E may be formed from metal traces on a printed circuit, transparent conductive structures on a printed circuit or overlapping a display, and/or other conductive electrode structures organized in an array (e.g., a two-dimensional array or a one-dimensional array as shown in FIG. 6). Electrodes 58E may form an elongated strip that runs along the lower edge of portion 10A-1 and display 20A of device 10A. Capacitive sensing circuitry 58C (e.g., a self-capacitance circuit or a mutual-capacitance circuit) may be used in gathering position information (proximity measurements and/or touch sensor measurements) using the capacitive sensor readings from electrodes 58E (and, if desired, optional additional electrodes such an active shield, ground, etc.). Electrodes 58E may have any suitable shapes (e.g., rectangular shapes, trapezoidal shapes, diamond shapes, circular shapes, square shapes, other shapes with curved and/or straight edges, other shapes with two or more non-orthogonal edges such as the edges associated with tapered finger protrusions and/or tapered recesses, etc.). In the example of FIG. 6, each electrode 58E has sloped left and right edges with a sufficient angle to ensure that any given edge of device 10B will overlap two different electrodes. This type of overlapping arrangement may enhance position sensing accuracy for sensor 58.

Figure 7:
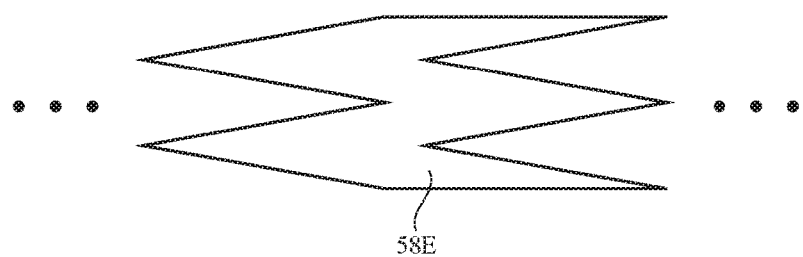
FIG. 7 is a diagram of an illustrative capacitive sensor electrode in accordance with an embodiment.

Consider, as an example, a scenario in which device 10B (e.g., a device with a metal housing sensed by electrodes 58E) overlaps sensor 58 as shown in FIG. 6. In this arrangement, capacitors C1 and C5 are not overlapped, so control circuitry 12 can conclude that device 10B lies between capacitors C1 and C5. The left edge of device 10B overlaps electrodes C2 and C3 and the right edge of device 10B overlaps electrodes C3 and C4. The capacitance values measured using electrodes C2 and C3 can be processed to determine the location of the left edge of device 10B. The capacitance values measured using electrodes C3 and C4 can be processed to determine the location of the right edge of device 10B. Other overlapping (tiled) electrode shapes can be used in strip-shaped capacitive sensor 58, if desired (see, e.g., the illustrative interlocking and overlapping electrode shape of electrode 58E of FIG. 7). Electrodes 58E may be formed from metal traces on a printed circuit (e.g., in configurations in which sensor 58 lies below the pixels of display 20A) or may be formed from indium tin oxide pads or other transparent electrode structures (e.g., in configurations in which the electrodes overlap display pixels).

Figure 8:
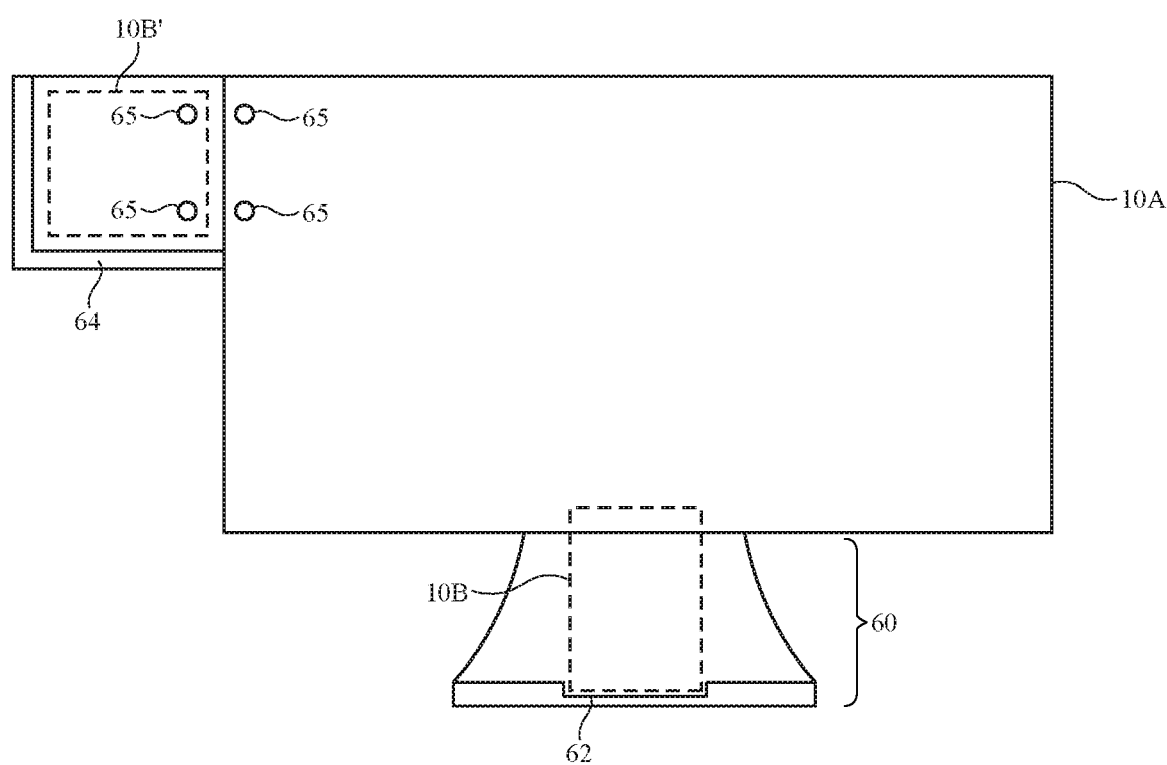
FIG. 8 is a front view of an illustrative desktop computer with housing structures configured to receive a portable device such as a cellular telephone in accordance with an embodiment.

FIG. 8 is a front view of devices 10A and 10B in an illustrative configuration in which device 10A is a desktop computer with a stand such as stand 60. As shown in FIG. 8, housing structures in device 10A such as stand 60 may be configured to form a recess such as recess 62 or other support structures that receive and support device 10B. Device 10B may, for example, be supported in a position that places the display of device 10B adjacent to and/or overlapping the display of device 10A. If desired, support structures in the housing of device 10A such as illustrative support structures 64 may be formed adjacent to one or more edges of device 10A (e.g., along the left or right side of the display in the main body of device 10A). Support structures 64 may receive and support device 10B so that the display of device 10B is adjacent to and/or overlapping the left edge of device 10A as shown by illustrative device 10B'. Magnets and/or iron bars or other magnetic structures 65 may be used to help hold device 10B' in place adjacent to the edge of device 10A.

Figure 9:
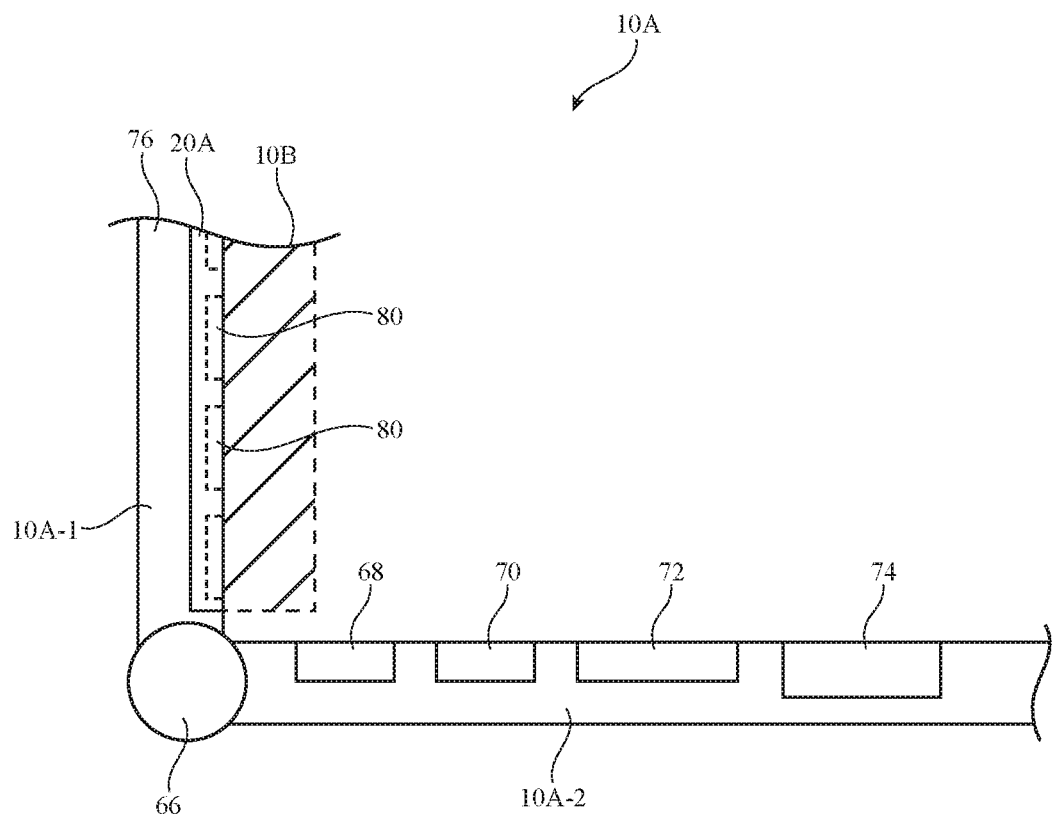
FIG. 9 is a cross-sectional side view of an illustrative laptop computer showing illustrative sensor locations for detecting a cellular telephone or other portable device in accordance with an embodiment.

In addition to or instead of using a capacitive sensor formed from a strip of electrodes 58E to measure the relative position of devices 10, sensors 18 in device 10A and/or 10B may include other sensor components for measuring the position of device 10B relative to device 10A. An illustrative configuration for device 10A in which device 10A includes additional sensors 68, 70, 72, and/or 74 is shown in FIG. 9. In this example, device 10A is a laptop computer having an upper portion such as portion 10A-1 coupled by hinge 66 to a lower portion such as portion 10A-2. Display 20A may be formed in the housing of portion 10A-1 (see, e.g., housing member 76). Housing member 76 and/or other housing structures for devices 10 may be formed from polymer, metal, glass, ceramic, fabric, wood, other materials and/or combinations of two or more of these materials.

Display 20A may include an array of pixels for displaying images and an overlapping array of transparent capacitive touch sensor electrodes 80. Electrodes 80 may be arranged in a strip along the lower edge of display 20A (e.g., to form sensor 58 of FIG. 6) and/or may form a two-dimensional capacitive sensor array overlapping display 20A (e.g., display 20A may have a touch sensor and some or all of the touch sensor electrodes can gather touch and/or proximity measurements to measure the position of device 10B).

Sensor 68 may be an optical sensor (e.g., a visible light and/or infrared light sensor such as an infrared proximity sensor having one or more infrared light-emitting devices such as lasers and/or light-emitting diodes and having one or more infrared light detectors for detecting reflected infrared light). An array of the light emitting and/or detecting components of sensors 68 can be arranged in a strip along the lower edge of display 20A (as an example).

Sensor 70 may be an ultrasonic sensor. Sensor 70 may, for example, include an ultrasonic sound emitter (e.g., a speaker or vibrating element) and an ultrasonic sound detector (e.g., a microphone). Configurations in which sensor 70 has an array of ultrasonic sensor components may also be used. These components may perform echolocation (time-based measurements) and/or signal strength measurements to determine when device 10B is present and to measure the position of device 10B.

Sensor 72 may include a capacitive proximity sensor that can detect device 10B at a distance of 1-100 mm, less than 50 mm, less than 15 mm, more than 5 mm, or other suitable distance. Sensor 72 may have one or more electrodes (e.g., a strip of electrodes along the upper edge of portion 10A-2 and running along hinge 66, etc.).

Sensor 74 may include one or more speakers for emitting ultrasonic sound and/or other sound and one or more microphones for measuring sound. The speakers in sensor 74 may include speakers at opposing sides of portion 10A-2 for playing left and right audio during normal music playback operations. During sensing operations, these speakers may emit sound that is detected by microphones in sensor 74. By processing emitted sound that has been reflected from device 10B sensor 74 can determine the position of device 10B relative to device 10A. If desired, device 10A may emit sound (e.g., using speakers in sensor 74) that is detected using one or more microphones in device 10B. For example, a left speaker in portion 10A-2 may emit an ultrasonic tone of a first frequency and a right speaker in portion 10A-2 may emit an ultrasonic tone of a second frequency or ultrasonic signals at a common frequency may be emitted at different times by the left and right speakers. A microphone in device 10B may compare received signal strengths to determine the position of device 10B. Arrangements in which device 10B emits ultrasonic signals (e.g., with a speaker) and microphones in sensor 74 determine location by making received signal strength measurements may also be used.

If desired, radio-frequency sensors, position, orientation, and/or motion sensors, force sensors, temperature sensors, magnetic sensors, and/or other sensors may be used in gathering relative position information. The foregoing examples are illustrative.

Figure 10:
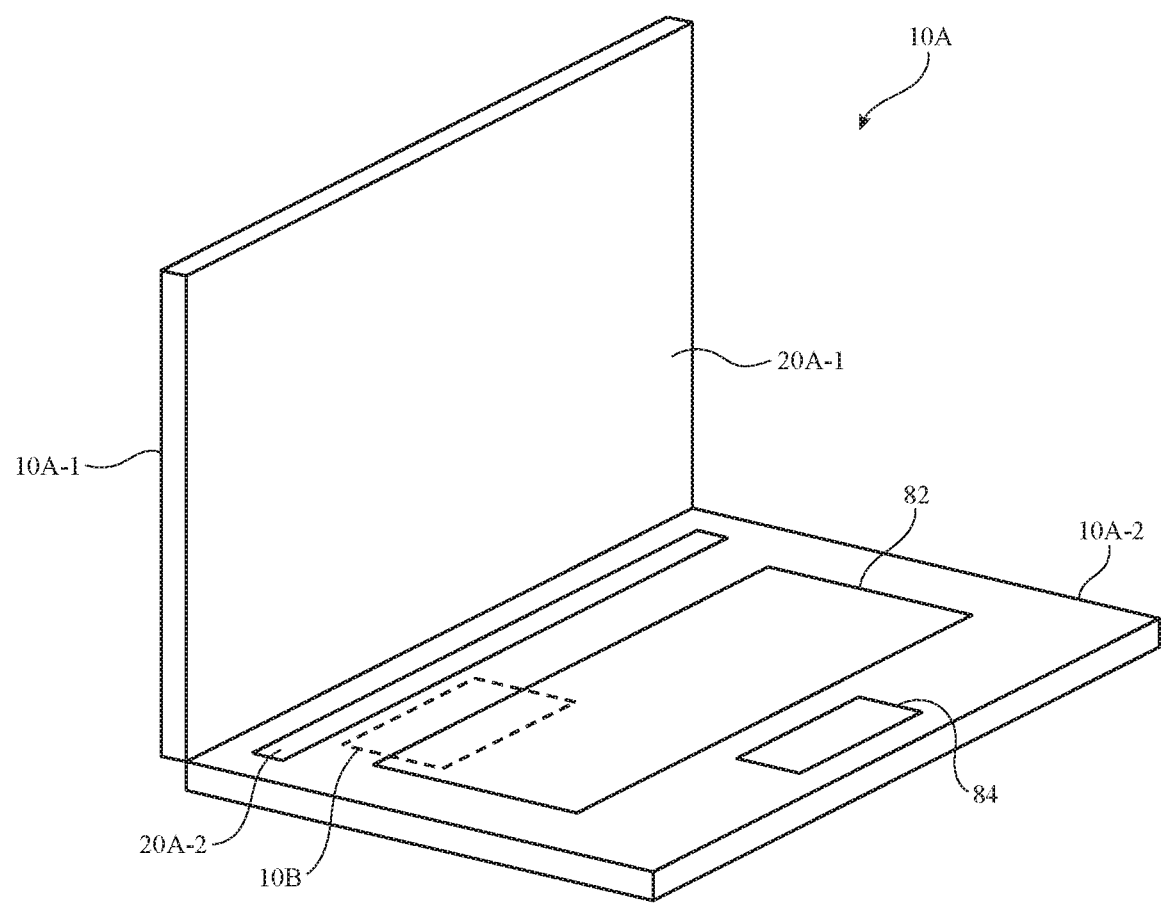
FIG. 10 is a perspective view of an illustrative electronic device such as a laptop computer having a primary display and a secondary display and an associated cellular telephone placed adjacent to the secondary display in accordance with an embodiment.

In the illustrative arrangement of FIG. 10, device 10A has two displays. A first display such as display 20A-1 may be mounted in upper housing portion 10A-1 of device 10A and may use the main display for device 10A. A second display such as display 20A-2 may be a touch sensitive display having an elongated strip shape and may be formed in lower portion 10A-2. Keyboard 82 and track pad 84 may also be formed in the housing of portion 10A-2. Display 20A-2 may form dynamic function keys and may sometimes be referred to as a dynamic function row. As shown in FIG. 10, device 10B may be placed adjacent to display 20A-2 and may operate in a linked fashion with device 10A in which a user can drag-and-drop and/or otherwise move content between display 20A-2 and the display of device 10B (and/or, if desired, display 20A-1). If desired, device 10B and the display of device 10B may overlap a portion of device 10A and the display of device 10A and may operate as described in connection with the displays of devices 10A and 10B of FIG. 2.

Figure 11:
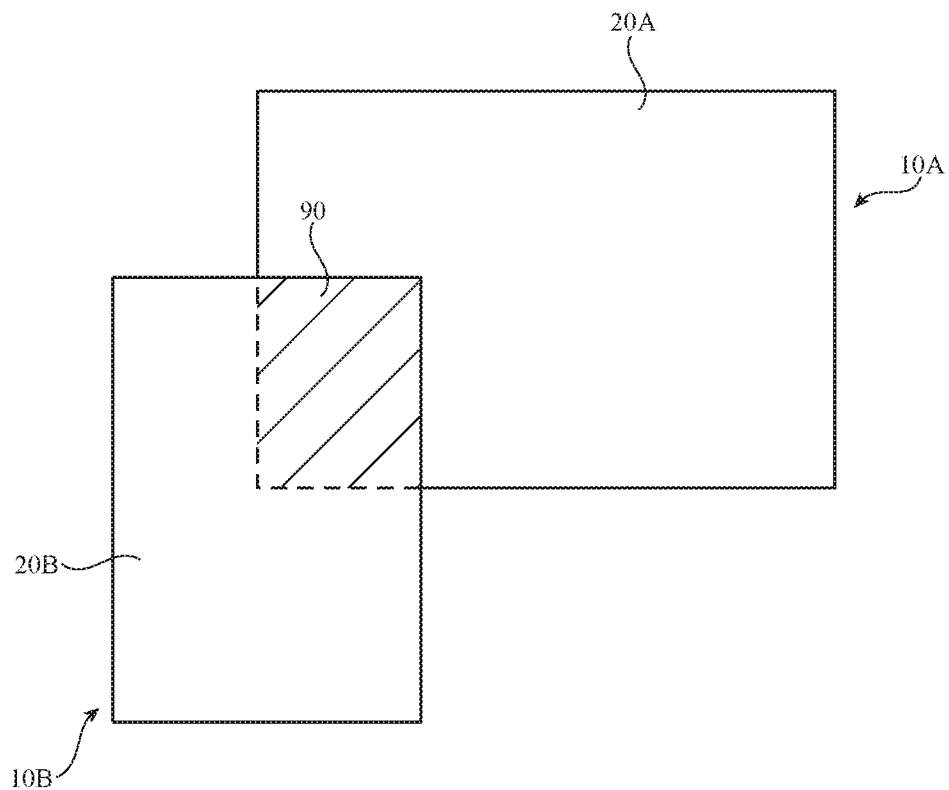
FIG. 11 is a front view of a pair of devices such as a portable electronic device operated in front of a computer in accordance with an embodiment.

As shown in FIG. 11, device 10B may be held in front of device 10A (e.g., in a user's hand or supported by a stand, bracket, or other support structure) so that display 20B overlaps display 20A in region 90. Device 10A may be, for example, a desktop computer or other electronic device and device 10B may be, for example, a cellular telephone or other portable electronic device. As described in connection with FIG. 2, devices 10A and 10B can be operated in a linked mode while devices 10A and 10B are overlapped in this way. To detect overlap between devices 10A and 10B, sensors 18 may be used to measure the locations of devices 10A and 10B and the location of the eyes of the user of devices 10A and 10B (e.g., the location of a viewing position at which the user's eyes are located).

Figure 12:
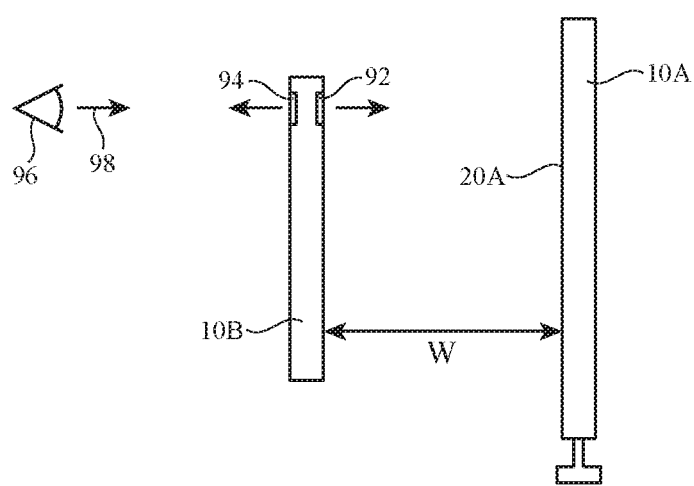
FIG. 12 is a side view of the devices of FIG. 11 showing how sensors such as depth sensors may be used in determining which portion of the display in the computer is overlapped by the display in the portable electronic device in accordance with an embodiment.

As shown in FIG. 12, for example, device 10B may have forward facing sensor 94 and rear facing sensor 92. Sensor 92 and/or sensor 94 may be depth sensors formed from stereoscopic cameras, may be structured light depth sensors each of which has a light source such as an array of lasers for emitting an array of light beams and a camera that captures images containing spots where the light beams illuminate target structures, an ultrasonic or radio-frequency depth sensor, sensors including visible light cameras and/or infrared light cameras, and/or other sensors 18. Using sensor 92, device 10B can monitor the viewing position of the eyes of a user (see, e.g., eyes 96, which are viewing devices 10B and 10A in direction 98) and can thereby determine the viewing position of the user's eyes and direction of gaze of the user relative to device 10B. As shown in FIG. 12, devices 10A and 10B may be separated by an air gap W (e.g., a gap of 1-100 cm, at least 5 cm, at least 100 cm, less than 200 cm, less than 150 cm, less than 50 cm, or other suitable distance) while devices 10B and 10A are being viewed in direction 98. Sensor 92 can monitor device 10A and thereby determine the location of display 20A relative to device 10B. Using information on the relative positions of the viewing position for eyes 96, device 10B, and device 10A, control circuitry 12 can determine the shape and location of overlapping region 90 as viewed from the perspective of user eyes 96 and can support linked mode operations using overlapping region 90 as described in connection with FIG. 2.

The foregoing is merely illustrative and various modifications can be made to the described embodiments. The foregoing embodiments may be implemented individually or in any combination.

What is claimed is:

1. A laptop computer configured to wirelessly communicate with a portable device, comprising:
    a housing having an upper portion and a lower portion coupled by a hinge;
    a touch-insensitive display supported by the upper portion of the housing;
    a keyboard and trackpad supported by the lower portion;
    a strip-shaped capacitive sensor that is supported by the housing and located between the touch-insensitive display and the keyboard, wherein the strip-shaped capacitive sensor is configured to measure a position of the portable device when the portable device overlaps the touch-insensitive display in the upper portion of the housing; and
    control circuitry that is configured to use the measured position to:
        move content on the touch-insensitive display so that the content is not obscured by the portable device; and
        display a first portion of an image while the portable device displays a second portion of the image.

2. The laptop computer defined in claim 1 wherein the control circuitry is configured to use the measured position in presenting information on the touch-insensitive display, wherein the strip-shaped capacitive sensor has an array of metal electrodes extending parallel to the edge of the touch-insensitive display.

3. The laptop computer defined in claim 2 wherein each of the metal electrodes has at least two non-orthogonal edges.

4. The laptop computer defined in claim 1 wherein the strip-shaped capacitive sensor has metal electrodes that each have at least two non-orthogonal edges.

5. The laptop computer defined in claim 1 wherein the portable device includes patterned conductive structures representing encoded information and wherein the strip-shaped capacitive sensor is configured to obtain the encoded information by sensing the conductive structures.

6. The laptop computer defined in claim 5 wherein the encoded information includes device model information for the portable device.

7. The laptop computer defined in claim 1 wherein the portable device includes a conductive structure and is configured to drive a signal onto the conductive structure and wherein the strip-shaped capacitive sensor is configured to obtain device model information by monitoring the conductive structure.

8. The laptop computer defined in claim 1 wherein the control circuitry is configured to present information on the touch-insensitive display based on the measured position.

9. The laptop computer defined in claim 1 wherein the portable device has first and second edges with respective first and second positions and wherein the strip-shaped capacitive sensor is configured to measure the first and second positions.

10. The laptop computer defined in claim 9 wherein the control circuitry is configured to use the first position and the second position in displaying the content on the touch-insensitive display.

11. The laptop computer defined in claim 10 further comprising wireless communications circuitry, wherein the control circuitry is configured to use the wireless communications circuitry in operating in a linked mode with the portable device.

12. A system comprising:
    a laptop computer having a hinge, a first display that is touch insensitive, a trackpad that receives trackpad input, and a strip-shaped capacitive sensor with metal electrodes that is located between the first display and the hinge; and
    a portable electronic device with a second display and a touch sensor that receives touch sensor input, wherein the strip-shaped capacitive sensor is configured to measure relative position between the laptop computer and the portable electronic device when the portable electronic device is positioned with the second display overlapping the first display, and wherein the laptop computer and portable electronic device are configured to operate in a linked mode in which:
        input gathering and content displaying operations are shared between the laptop computer and the portable electronic device using the measured relative position;
        the portable electronic device is configured to display content that has been moved from the first display to the second display; and
        the content on the first display is adjusted based on the touch sensor input and the content on the second display is adjusted based on the trackpad input.

13. The system defined in claim 12 wherein each of the metal electrodes has at least two non-orthogonal edges.

14. The system defined in claim 13 wherein the metal electrodes of the strip-shaped capacitive sensor extend along an edge of the first display without overlapping any portion of the display.

15. The system defined in claim 12 wherein the portable electronic device is configured to receive user input and wherein the laptop computer and the portable electronic device operate in the linked mode in response to the user input.

16. The system defined in claim 15 wherein the portable electronic device comprises a motion sensor configured to gather the user input.

17. The system defined in claim 16 wherein the portable electronic device comprises a cellular telephone.

18. A system operable by a user with eyes at a viewing position, comprising:
    a first electronic device with a first display; and
    a second electronic device with a second display and first and second depth sensors, wherein the first depth sensor is configured to make a first measurement of relative position between the viewing position and the second electronic device, wherein the second depth sensor is configured to make a second measurement of relative position between the first electronic device and the second electronic device while the first and second electronic devices are separated by an air gap, wherein the first and second electronic devices are configured to wirelessly communicate and operate in a linked mode in which input gathering and content displaying operations are shared between the first and second electronic devices based on the first and second measurements when the second display overlaps a portion of the first display as viewed from the viewing position while the first and second electronic devices are separated by the air gap, and wherein display content is apportioned between the first and second displays based on the first and second measurements such that a first portion of the display content is viewable on the first display while a second portion of the display content is viewable on the second display when the second display overlaps the portion of the first display.

19. The system defined in claim 18 wherein the second electronic device has opposing front and rear faces and wherein the first depth sensor is on the front face and wherein the second depth sensor is on the rear face.

20. The system defined in claim 19 wherein the first electronic device comprises a desktop computer and wherein the second electronic device comprises a cellular telephone.

\* \* \* \* \*